United States Patent
Luo (10) Patent No.: US 10,740,472 B2
(45) Date of Patent: Aug. 11, 2020

(54) MULTIMEDIA FILE PROCESSING METHOD, MULTIMEDIA FILE PROCESSING APPARATUS, AND COMPUTER READABLE STORAGE MEDIUM

(71) Applicant: Yulong Computer Telecommunication Scientific (Shenzhen) Co., Ltd., Shenzhen, Guangdong (CN)

(72) Inventor: Yalong Luo, Guangdong (CN)

(73) Assignee: Yulong Computer Telecommunication Scientific (Shenzhen) Co., Ltd., Shenzhen (CN)

(*) Notice: Subject to any disclaimer, the term of this patent is extended or adjusted under 35 U.S.C. 154(b) by 254 days.

(21) Appl. No.: 15/440,076

(22) Filed: Feb. 23, 2017

(65) Prior Publication Data
US 2017/0161504 A1 Jun. 8, 2017

Related U.S. Application Data

(63) Continuation of application No. PCT/CN2014/092285, filed on Nov. 26, 2014.

(51) Int. Cl.
G06F 21/00 (2013.01)
G06F 21/60 (2013.01)
G06F 21/10 (2013.01)

(52) U.S. Cl.
CPC .............. *G06F 21/60* (2013.01); *G06F 21/10* (2013.01); *G06F 2221/0735* (2013.01); *G06F 2221/2113* (2013.01)

(58) Field of Classification Search
CPC .................................................... G06F 21/60
See application file for complete search history.

(56) References Cited

U.S. PATENT DOCUMENTS

| | | | |
|---|---|---|---|
| 6,178,503 B1* | 1/2001 | Madden | G06F 1/24 710/8 |
| 6,973,447 B1 | 12/2005 | Aguilar et al. | |
| 2005/0251689 A1* | 11/2005 | Lee | H04N 7/1675 713/189 |
| 2008/0008439 A1* | 1/2008 | Liu | H04N 7/17318 386/248 |
| 2008/0163368 A1 | 7/2008 | Harris et al. | |
| 2014/0115330 A1 | 4/2014 | Chen | |
| 2014/0122820 A1 | 5/2014 | Park et al. | |
| 2014/0380468 A1* | 12/2014 | Gerzon | G06F 21/52 726/22 |
| 2015/0227535 A1* | 8/2015 | Avati | G06F 16/116 707/741 |

FOREIGN PATENT DOCUMENTS

| CN | 103150174 A | 6/2013 |
|---|---|---|
| CN | 104156657 A | 11/2014 |

OTHER PUBLICATIONS

Extended European search report issued in corresponding European application No. 14906930.4 dated Dec. 6, 2017.

* cited by examiner

*Primary Examiner* — Josnel Jeudy (57) ABSTRACT

A multimedia file processing method and a multimedia file processing apparatus include: according to attributes of an acquired multimedia file, selecting a designated operating system for processing the multimedia file from multiple operating systems; and using the designated operating system to process the multimedia file.

17 Claims, 5 Drawing Sheets

MULTIMEDIA FILE PROCESSING METHOD, MULTIMEDIA FILE PROCESSING APPARATUS, AND COMPUTER READABLE STORAGE MEDIUM

CROSS-REFERENCE TO RELATED APPLICATION(S)

This application is a continuation of International Application No. PCT/CN2014/092285, filed on Nov. 26, 2014, the content of which is herein incorporated by reference in its entirety.

TECHNICAL FIELD

The present disclosure relates to the field of terminal technology, and particularly to a multimedia file processing method, a multimedia processing apparatus, and computer readable storage medium.

BACKGROUND

Currently, in both single-system terminals and multi-system terminals, multimedia files are processed by a current operating system. For example, in single-system terminals, audio or video in a supported format can be encoded or decoded by an audio and video encoder/decoder of the terminal itself; on the other hand, audio or video in an un-supported format cannot be encoded or decoded. When processing audio or video files, the terminal cannot directly protect the audio and video files, which easily lead to leakage of sensitive information of users. Therefore, existing terminals generally protect the sensitive information by perform secondary encryption on the audio and video files. However, the secondary encryption of the audio and video files is time-consuming and has high cost, thus reduce the user experience.

Therefore, it is desirable to provide a new technical scheme, which can effectively protect the sensitive information in multimedia files to be processed and reduce the cost of protection.

SUMMARY

Based on at least one of the above mentioned problems, a new technical solution is proposed in the present disclosure, which can effectively protect sensitive information of multimedia files required to be processed, and reduce the cost of protection.

In view of this, the present disclosure provides a multimedia file processing method, which includes: according to the attribute of a multimedia file acquired, a designated operating system for processing the multimedia file is selected from multiple operating systems; and the designated operating system is used to process the multimedia file.

Instead of processing a sensitive multimedia file in the current operating system directly, in this technical scheme, the designated operating system is invoked to process (such as encode, decode, and so on) the multimedia file having sensitive information, in this way, the security of the sensitive information can be enhanced, the privacy of the user can be protected, and the user experience can be improved. Moreover, since the multimedia file is processed by the designated operating system, for the current operating system, the multimedia file can be considered as encrypted, and therefore, no secondary encryption of the multimedia file in the current operating system is required, and as a consequence, the cost for protecting information can be saved.

In the above-mentioned technical scheme, as an implementation, the process that the designated operating system for processing the multimedia file is selected from the multiple operating systems according to the attribute of the multimedia file acquired includes: the designated operating system is selected from the multiple operating systems according to a selection command received; or, an operating system with the highest security level is selected as the designated operating system according to the security levels of the multiple operating systems.

In this technical scheme, the designated operating system can be selected by the user directly, for example, in a dual-operating system based terminal, when the user wants to play a certain private video, he or she can set a security system to be the designated operating system for playing the video. Alternatively, an operating system with the highest security level can be selected to process the multimedia file. For example, in a terminal with an Android system, a Windows system, and a security system, the security level of the Android system is a low level, the security level of the Windows system is a middle level, and the security level of the security system is a high level; based on this, when a decoding command for a certain sensitive video is received in the Android system, the security system, which has the highest security level, can be selected to decode the sensitive video. With aid of the above-mentioned technical scheme, according to the needs of the user or according to the security level, the most appropriate or safest operating system of the multiple operating systems can be selected as the designated operating system, and the security of user information can be enhanced.

In the above-mentioned technical scheme, as an implementation, the process that the designated operating system for processing the multimedia file is selected from the multiple operating systems according to the attribute of the multimedia file acquired includes: according to the attribute of the multimedia file, candidate operating systems having permission to process the multimedia file can be determined from among the multiple operating systems; and the designated operating system is selected from the candidate operating systems according to a selection command received, or, an operating system with the highest security level is selected as the designated operating system according to the security levels of the candidate operating systems.

In this technical scheme, among the multiple operating systems, the multimedia file can only be accessed by operating systems having permission to process the multimedia file, and the designated operating system can be selected from these permitted operating systems by the user, or, the operating system with the highest security level can be selected from these permitted operating systems to process the multimedia file.

In the above-mentioned technical scheme, as an implementation, the process that the designated operating system is used to process the multimedia file can include at least one of the following or a combination thereof: using the designated operating system to encode or decode the multimedia file; using the designated operating system to copy, move, or edit the multimedia file; using the designated operating system to delete the multimedia file; configuring, in the designated operating system, the processing permission on the multimedia file for each operating system of the multiple operating systems.

In this technical scheme, using the designated operating system to process the multimedia file including but not limited to: using the designated operating system to encode, decode, copy, move, delete, edit, and set permission, and so on. With aid of the above-mentioned technical scheme, in a terminal, all of the operations on the multimedia file can be conducted by an operating system designated by the user or having a higher security level, therefore, the security of user information can be enhanced and the user can be provided with a more humane service.

In the above-mentioned technical scheme, the attribute of the multimedia file includes at least one of the following or a combination thereof: the name of the multimedia file, the source of the multimedia file, the format of the multimedia file, and the security level of the multimedia file.

In this technical scheme, the attribute of the multimedia file includes at least one of the following or a combination thereof: the name, the source, the format, and the security level. For example, in a dual-operating system based terminal, a multimedia file from a designated contact(s) can be set to sensitive information by the user, in this way, when the terminal receives a decoding request for the multimedia file from the designated contact in a ordinary system, it can use a security system with a higher security level to decode the multimedia file.

According to another aspect of the present disclosure, it is provided a multimedia file processing apparatus. The apparatus includes: a selecting unit, configured to select from multiple operating systems a designated operating system for processing a multimedia file acquired according to the attribute of the multimedia file; and a processing unit, configured to use the designated operating system to process the multimedia file.

Instead of processing a sensitive multimedia file in the current operating system directly, in this technical scheme, the designated operating system is invoked to process (such as encode, decode, and so on) the multimedia file having sensitive information, in this way, the security of the sensitive information can be enhanced, the privacy of the user can be protected, and the user experience can be improved. Moreover, since the multimedia file is processed by the designated operating system, for the current operating system, the multimedia file can be considered as encrypted, and therefore, no secondary encryption of the multimedia file in the current operating system is required, and as a consequence, the cost for protecting information can be saved.

In the above-mentioned technical scheme, as an implementation, the selecting unit is configured to: select the designated operating system from the multiple operating systems according to a selection command received; or, select an operating system with the highest security level as the designated operating system according to the security levels of the multiple operating systems.

In this technical scheme, the designated operating system can be selected by the user directly, for example, in a dual-operating system based terminal, when the user wants to play a certain private video, he or she can set a security system to be the designated operating system for playing the video. Alternatively, an operating system with the highest security level can be selected to process the multimedia file. For example, in a terminal with an Android system, a Windows system, and a security system, the security level of the Android system is a low level, the security level of the Windows system is a middle level, and the security level of the security system is a high level; based on this, when a decoding command for a certain sensitive video is received in the Android system, the security system, which has the highest security level, can be selected to decode the sensitive video. With aid of the above-mentioned technical scheme, according to the needs of the user or according to the security level, the most appropriate or safest operating system of the multiple operating systems can be selected as the designated operating system, and the security of user information can be enhanced.

In the above-mentioned technical scheme, as an implementation, the selecting unit includes: a determining unit, configured to determine candidate operating systems having permission to process the multimedia file from among the multiple operating systems according to the attribute of the multimedia file; and the selecting unit is configured to: select the designated operating system from the candidate operating systems according to a selection command received, or, select an operating system with the highest security level as the designated operating system according to the security levels of the candidate operating systems.

In this technical scheme, among the multiple operating systems, the multimedia file can only be accessed by operating systems having permission to process the multimedia file, and the designated operating system can be selected from these permitted operating systems by the user, or, the operating system with the highest security level can be selected from these permitted operating systems to process the multimedia file. According to the above technical scheme, it is possible to select the most suitable or safest designated operating system from the operating systems having the permission to process the multimedia file according to the demand of the user or according to the security level, thereby enhancing the security of user information.

In the above-mentioned technical scheme, the processing unit is configured for at least one of the following or a combination thereof: using the designated operating system to encode or decode the multimedia file; using the designated operating system to copy, move, or edit the multimedia file; using the designated operating system to delete the multimedia file; configuring, in the designated operating system, the processing permission on the multimedia file for each operating system of the multiple operating systems.

In this technical scheme, using the designated operating system to process the multimedia file including but not limited to: using the designated operating system to encode, decode, copy, move, delete, edit, and set permission, and so on. With aid of the above-mentioned technical scheme, in a terminal, all of the operations on the multimedia file can be conducted by an operating system designated by the user or having a higher security level, therefore, the security of user information can be enhanced and the user can be provided with a more humane service.

In the above-mentioned technical scheme, the attribute of the multimedia file includes at least one of the following or a combination thereof: the name of the multimedia file, the source of the multimedia file, the format of the multimedia file, and the security level of the multimedia file.

In this technical scheme, the attribute of the multimedia file includes at least one of the following or a combination thereof: the name, the source, the format, and the security level. For example, in a dual-operating system based terminal, a multimedia file from a designated contact(s) can be set to sensitive information by the user, in this way, when the terminal receives a decoding request for the multimedia file from the designated contact in a ordinary system, it can use a security system with a higher security level to decode the multimedia file.

According to another aspect of the present disclosure, it is provided a terminal including the multimedia file processing apparatus described in the above-mentioned technical schemes. The terminal has all the beneficial effects of the multimedia file processing apparatus provided in the above technical scheme, and will not repeat here.

According to the above technical schemes, in an ordinary system, only the designated operating system can be invoked to encode, decode, and otherwise process the multimedia file having sensitive information, therefore, the security of the sensitive information can be enhanced, the privacy of the user can be protected, and the user experience can be improved. Moreover, the technical schemes of the present disclosure can replace the technical scheme in the related art of performing secondary encryption on a file having sensitive information, and the cost for protecting the sensitive information can be reduced.

DETAILED DESCRIPTION

In order to illustrate the technical solutions of the present disclosure or the related art more clearly, a brief description of the accompanying drawings used herein is given below. Obviously, the drawings listed below are only examples, and a person skilled in the art should be noted that, other drawings can also be obtained on the basis of these exemplary drawings without creative work.

In the following description, numerous specific details are set forth in order to facilitate a thorough understanding of the present disclosure, however, the present disclosure can be practiced otherwise than as specifically described herein, and therefore, the scope of the present disclosure is not to be limited by the specific implementations disclosed below.

Figure 1:
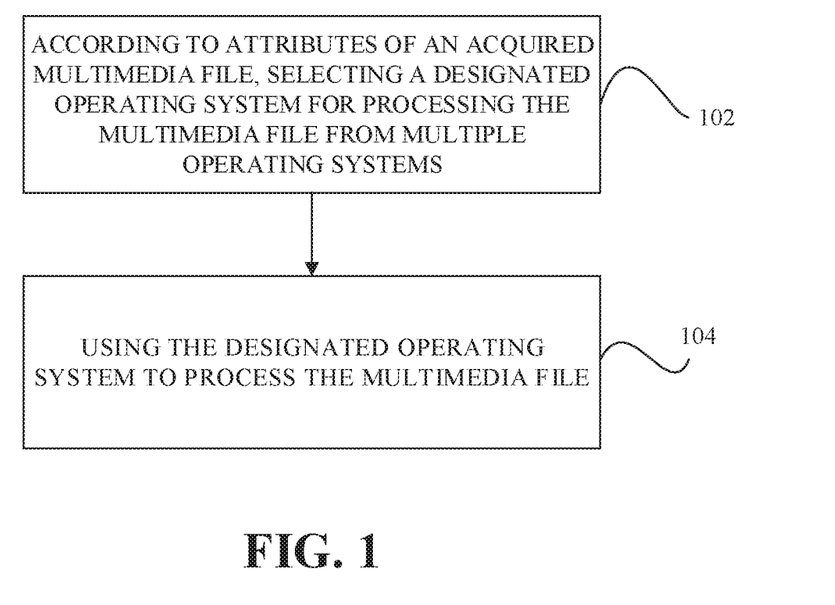
FIG. 1 is a flow chart illustrating a multimedia file processing method according to an implementation of the present disclosure.

FIG. 1 is a flow chart illustrating a multimedia file processing method according to an implementation of the present disclosure, and the method can be performed in a terminal such as a multi-system terminal.

As illustrated in FIG. 1, the multimedia file processing method according to the implementation of the present disclosure includes: S102, according to the attribute of a multimedia file acquired, a designated operating system for processing the multimedia file is selected from multiple operating systems of a terminal; and S104, the designated operating system is used to process the multimedia file in the terminal.

Instead of processing a sensitive multimedia file in the current operating system directly, in this technical scheme, the designated operating system is invoked to process (such as encode, decode, and so on) the multimedia file having sensitive information, in this way, the security of the sensitive information can be enhanced, the privacy of the user can be protected, and the user experience can be improved.

Moreover, since the multimedia file is processed by the designated operating system, for the current operating system, the multimedia file can be considered as encrypted, and therefore, no secondary encryption of the multimedia file in the current operating system is required, and as a consequence, the cost for protecting information can be saved.

In the above-mentioned technical scheme, step 102 can include: the designated operating system is selected from the multiple operating systems according to a selection command received; or, an operating system with the highest security level is selected as the designated operating system according to the security levels of the multiple operating systems.

In this technical scheme, the designated operating system can be selected by the user directly, for example, in a dual-operating system based terminal, when the user wants to play a certain private video, he or she can set a security system to be the designated operating system for playing the video. Alternatively, an operating system with the highest security level can be selected to process the multimedia file. For example, in a terminal with an Android system, a Windows system, and a security system, the security level of the Android system is a low level, the security level of the Windows system is a middle level, and the security level of the security system is a high level; based on this, when a decoding command for a certain sensitive video is received in the Android system, the security system, which has the highest security level, can be selected to decode the sensitive video. With aid of the above-mentioned technical scheme, according to the needs of the user or according to the security level, the most appropriate or safest operating system of the multiple operating systems can be selected as the designated operating system, and the security of user information can be enhanced.

In the above-mentioned technical scheme, S102 can include: according to the attribute of the multimedia file, candidate operating systems having permission to process the multimedia file can be determined from among the multiple operating systems; and the designated operating system is selected from the candidate operating systems according to a selection command received, or, an operating system with the highest security level is selected as the designated operating system according to the security levels of the candidate operating systems.

In this technical scheme, among the multiple operating systems, the multimedia file can only be accessed by operating systems having permission to process the multimedia file, and the designated operating system can be selected from these permitted operating systems by the user, or, the operating system with the highest security level can be selected from these permitted operating systems to process the multimedia file.

In the above-mentioned technical scheme, S104 can include at least one of the following or a combination thereof: using the designated operating system to encode or decode the multimedia file; using the designated operating system to copy, move, or edit the multimedia file; using the designated operating system to delete the multimedia file; configuring, in the designated operating system, the processing permission on the multimedia file for each operating system of the multiple operating systems.

In this technical scheme, using the designated operating system to process the multimedia file including but not limited to: using the designated operating system to encode, decode, copy, move, delete, edit, and set permission, and so on. With aid of the above-mentioned technical scheme, in a terminal, all of the operations on the multimedia file can be conducted by an operating system designated by the user or having a higher security level, therefore, the security of user information can be enhanced and the user can be provided with a more humane service.

In the above-mentioned technical scheme, the attribute of the multimedia file includes at least one of the following or a combination thereof: the name of the multimedia file, the source of the multimedia file, the format of the multimedia file, and the security level of the multimedia file.

In this technical scheme, the attribute of the multimedia file includes at least one of the following or a combination thereof: the name, the source, the format, and the security level. For example, in a dual-operating system based terminal, a multimedia file from a designated contact(s) can be set to sensitive information by the user, in this way, when the terminal receives a decoding request for the multimedia file from the designated contact in a ordinary system, it can use a security system with a higher security level to decode the multimedia file.

Figure 2:
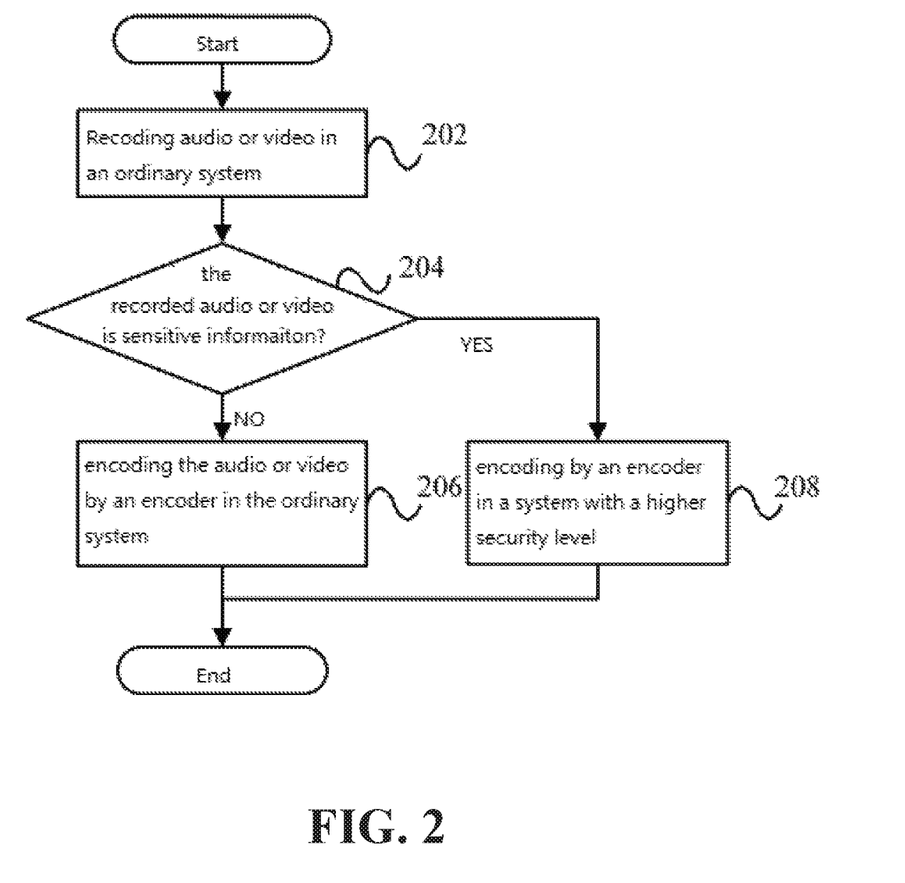
FIG. 2 is a flow chart illustrating a multimedia file processing method according to another implementation of the present disclosure.

FIG. 2 is a flow chart illustrating a multimedia file processing method according to another implementation of the present disclosure, and the method can be performed in a terminal including an ordinary system and other systems with a higher security level.

As illustrated in FIG. 2, the multimedia file processing method according another implementation of the present disclosure includes the follows:

S202, audio or video is recorded in an ordinary system.

S204, it is determined that whether the recorded audio or video is sensitive information, and if yes, proceed to S208, otherwise, proceed to S206. As to the terminal, it can determine whether the audio or video is sensitive information according to the attribute thereof, among which the attribute includes the name, source, format, and security level and so on. For example, when the audio or video is recorded for a private contact, the recorded audio or video will be identified as sensitive information.

S206, the audio or video will be encoded through an encoder in the ordinary system.

S208, the audio or video will be encoded by a designated encoder in a system with a higher security level. Instead of processing the sensitive information directly in an ordinary system, the encoding process on the sensitive information can be carried out by invoking the system with a higher security level, in this way, the security of the sensitive information can be enhanced and the privacy of the user can be protected, and therefore, the user experience can be improved. Since no secondary encryption of the sensitive information is required for the protection thereof in the ordinary system, the cost for protecting information can be saved.

Figure 3:
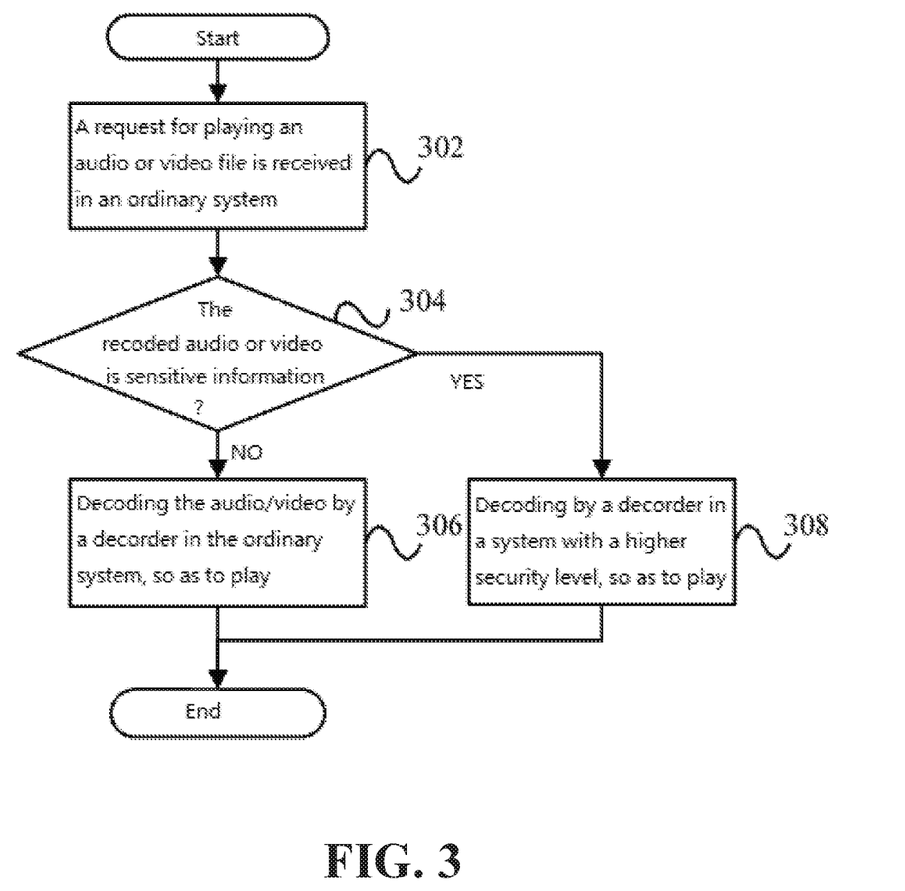
FIG. 3 is a flow chart illustrating a further multimedia file processing method according to an implementation of the present disclosure.

FIG. 3 is a flow chart illustrating a further multimedia file processing method according to an implementation of the present disclosure; similarly, the method can be performed in a terminal including an ordinary system and other systems with a higher security level.

As illustrated in FIG. 3, the multimedia file processing method according to the implementation of the present disclosure includes the follows:

S302, a request for playing an audio or video file is received in an ordinary system.

S304, it is determined that whether the audio or video file is sensitive information, and if yes, proceed to S308, otherwise, proceed to S306. As to the terminal, it can determine whether the audio or video file is sensitive information according to the attribute thereof, among which the attribute includes the name, source, format, and security level and so on. For example, when the file is audio or video transmitted from a private contact, it will be identified as sensitive information.

S306, the audio or video will be decoded for playing by a decoder of the ordinary system.

S308, the audio or video will be decoded for playing by a designated decoder in a system with a higher security level. Instead of processing the sensitive information directly in an ordinary system, the decoding process on the sensitive information can be carried out by invoking the system with a higher security level, in this way, the security of the sensitive information can be enhanced and the privacy of the user can be protected, and therefore, the user experience can be improved. Since no secondary encryption of the sensitive information is required for the protection thereof in the ordinary system, the cost of information protection can be saved.

Figure 4A:
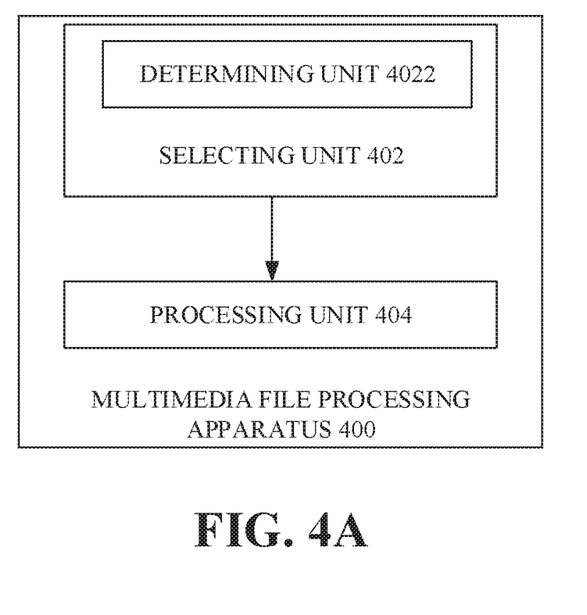
FIG. 4A and FIG. 4B are block diagrams illustrating a multimedia processing apparatus according to an implementation of the present disclosure.

FIG. 4A is a block diagram illustrating a multimedia processing apparatus according to an implementation of the present disclosure.

Figure 4B:
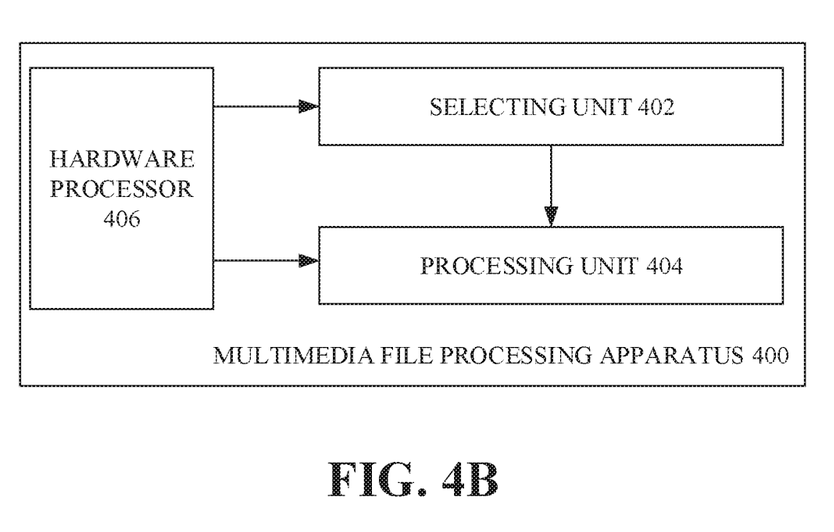

As illustrated in FIG. 4A, a multimedia file processing apparatus 400 according to an implementation of the present disclosure includes: a selecting unit 402, configured to select from multiple operating systems a designated operating system for processing a multimedia file acquired according to the attribute of the multimedia file; and a processing unit 404, configured to use the designated operating system to process the multimedia file. As an implementation, as shown in FIG. 4B, the multimedia processing apparatus can further include a hardware processor 406 for performing the selecting unit 402 and the processing unit 404 as well as other elements included in the apparatus.

Instead of processing a sensitive multimedia file in the current operating system directly, in this technical scheme, the designated operating system is invoked to process (such as encode, decode, and so on) the multimedia file having sensitive information, in this way, the security of the sensitive information can be enhanced, the privacy of the user can be protected, and the user experience can be improved. Moreover, since the multimedia file is processed by the designated operating system, for the current operating system, the multimedia file can be considered as encrypted, and therefore, no secondary encryption of the multimedia file in the current operating system is required, and as a consequence, the cost for protecting information can be saved.

In the above-mentioned technical scheme, as an implementation, the selecting unit 402 is configured to: select the designated operating system from the multiple operating systems according to a selection command received; or, select an operating system with the highest security level as the designated operating system according to the security levels of the multiple operating systems.

In this technical scheme, the designated operating system can be selected by the user directly, for example, in a dual-operating system based terminal, when the user wants to play a certain private video, he or she can set a security system to be the designated operating system for playing the video. Alternatively, an operating system with the highest security level can be selected to process the multimedia file. For example, in a terminal with an Android system, a Windows system, and a security system, the security level of the Android system is a low level, the security level of the Windows system is a middle level, and the security level of the security system is a high level; based on this, when a decoding command for a certain sensitive video is received in the Android system, the security system, which has the highest security level, can be selected to decode the sensitive video. With aid of the above-mentioned technical scheme, according to the needs of the user or according to the security level, the most appropriate or safest operating system of the multiple operating systems can be selected as the designated operating system, and the security of user information can be enhanced.

In the above-mentioned technical scheme, as an implementation, the selecting unit 402 includes: a determining unit 4022, configured to determine candidate operating systems having permission to process the multimedia file from among the multiple operating systems according to the attribute of the multimedia file; and the selecting unit 402 is configured to: select the designated operating system from the candidate operating systems according to a selection command received, or, select an operating system with the highest security level as the designated operating system according to the security levels of the candidate operating systems.

In this technical scheme, among the multiple operating systems, the multimedia file can only be accessed by operating systems having permission to process the multimedia file, and the designated operating system can be selected from these permitted operating systems by the user, or, the operating system with the highest security level can be selected from these permitted operating systems to process the multimedia file. According to the above technical scheme, it is possible to select the most suitable or safest designated operating system from the operating systems having the permission to process the multimedia file according to the demand of the user or according to the security level, thereby enhancing the security of user information.

In the above-mentioned technical scheme, the processing unit 404 is configured for at least one of the following or a combination thereof: using the designated operating system to encode or decode the multimedia file; using the designated operating system to copy, move, or edit the multimedia file; using the designated operating system to delete the multimedia file; configuring, in the designated operating system, the processing permission on the multimedia file for each operating system of the multiple operating systems.

In this technical scheme, using the designated operating system to process the multimedia file including but not limited to: using the designated operating system to encode, decode, copy, move, delete, edit, and set permission, and so on. With aid of the above-mentioned technical scheme, in a terminal, all of the operations on the multimedia file can be conducted by an operating system designated by the user or having a higher security level, therefore, the security of user information can be enhanced and the user can be provided with a more humane service.

In the above-mentioned technical scheme, the attribute of the multimedia file includes at least one of the following or a combination thereof: the name of the multimedia file, the source of the multimedia file, the format of the multimedia file, and the security level of the multimedia file.

In this technical scheme, the attribute of the multimedia file includes at least one of the following or a combination thereof: the name, the source, the format, and the security level. For example, in a dual-operating system based terminal, a multimedia file from a designated contact(s) can be set to sensitive information by the user, in this way, when the terminal receives a decoding request for the multimedia file from the designated contact in a ordinary system, it can use a security system with a higher security level to decode the multimedia file.

Figure 5:
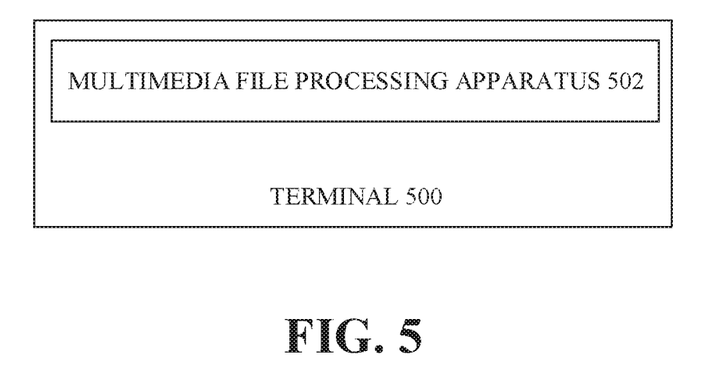
FIG. 5 is a block diagram illustrating a terminal according to an implementation of the present disclosure.

FIG. 5 is a block diagram illustrating a terminal according to an implementation of the present disclosure.

As illustrated in FIG. 5, a terminal 500 according to the implementation of the present disclosure includes: a multimedia file processing apparatus 502, configured to select from multiple operating systems a designated operating system for processing a multimedia file acquired according to the attribute of the multimedia file, and use the designated operating system to process the multimedia file.

Instead of processing a sensitive multimedia file in the current operating system directly, in this technical scheme, the designated operating system is invoked to process (such as encode, decode, and so on) the multimedia file having sensitive information, in this way, the security of the sensitive information can be enhanced, the privacy of the user can be protected, and the user experience can be improved. Moreover, since the multimedia file is processed by the designated operating system, for the current operating system, the multimedia file can be considered as encrypted, and therefore, no secondary encryption of the multimedia file in the current operating system is required, and as a consequence, the cost of information protection can be saved.

In this technical scheme, the multimedia file processing apparatus 502 in the terminal 500 is equivalent to the multimedia file processing apparatus 400 according to the implementation illustrated in FIG. 4, and therefore, the multimedia file processing apparatus 502 can have all of the advantages of the multimedia file processing apparatus 400 of the above-mentioned implementation, and will not repeat here.

Figure 6:
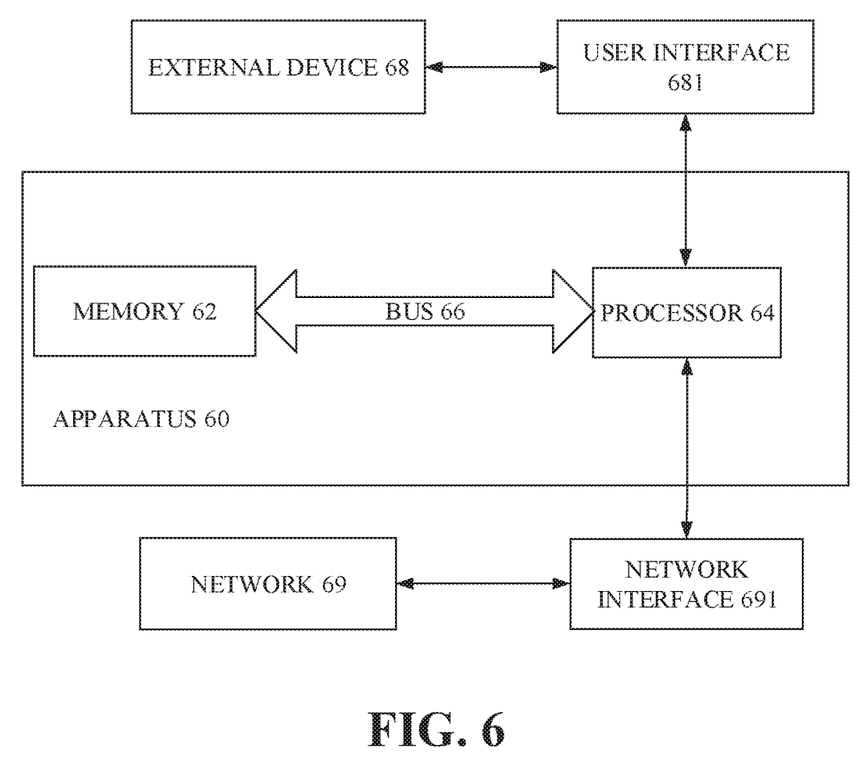
FIG. 6 is a block diagram illustrating an apparatus according to an implementation of the present disclosure.

According to another aspect of the present disclosure, it is provided an apparatus. FIG. 6 is a block diagram illustrating the apparatus. As illustrated in FIG. 6, an apparatus 60 includes a memory 62 and at least one processor 64 (for clarity, only one is illustrated in the figure).

The processor 64 is equivalent to and can be used as the hardware processor 406 as illustrated in FIG. 4. The processor 64 can be connected with the memory 62 in a wired or wireless manner, for example, through a bus 66. In addition, as illustrated in FIG. 6, the processor 64 can but not necessarily connect to an external device 68 through a user interface 681 or connect to a network 69 through a network interface 691. Alternatively, the processor can also connect to the external device or the network in a wireless manner.

The memory 62 is configured to store computer-readable program code, and can be ROM, RAM, CD-RAM, or any other removable storage medium.

The processor 64 is configured to invoke the computer-readable program code stored in the memory 62 to execute predetermined process (such as the methods according to the implementations of the present disclosure described above) or invoke/perform elements, units, or modules included in an apparatus (such as those included in the multimedia file processing apparatus according to the implementation of the present disclosure), to avoid unnecessarily obscuring the present disclosure, the details of the methods or apparatus is not repeated here.

Technical schemes of the present disclosure have been described with reference to the accompanying drawings. Through the technical schemes of the present disclosure, in an ordinary system, a multimedia file having sensitive information can only be encoded, decoded, and otherwise processed by invoking a designated operating system, therefore, the security of the sensitive information can be enhanced, the privacy of the user can be protected, and the user experience can be improved. In addition, the technical schemes of the present disclosure can replace the technical scheme for the secondary encryption of a file having sensitive information in the related art, and the cost for the protection of the sensitive information can be saved.

According to an implementation of the present disclosure, it is provided a program product stored in a non-volatile machine-readable medium. The program product is configured to process multimedia files and includes machine executable instructions for causing a computer system to perform the following steps: according to the attribute of a multimedia file acquired, a designated operating system for processing the multimedia file is selected from multiple operating systems; and the designated operating system is used to process the multimedia file.

According to an implementation of the present disclosure, it is provided a non-volatile machine-readable medium storing a program product for processing multimedia files. The program product includes machine executable instructions for causing a computer system to perform the following steps: according to the attribute of a multimedia file acquired, a designated operating system for processing the multimedia file is selected from multiple operating systems; and the designated operating system is used to process the multimedia file.

According to an implementation of the present disclosure, it is provided a machine-readable program, which is configured to cause a machine to perform the multimedia file processing method according to the above-mentioned technical schemes.

According to an implementation of the present disclosure, it is provided a storage medium storing machine readable program which is configured to cause a machine to perform the multimedia file processing method according to any of the above-mentioned technical schemes.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method of using a computer system having multiple operating systems to process a multimedia file using a designated operating system, comprising:
    selecting the designated operating system according to an attribute of the multimedia file;
    determining whether the multimedia file is sensitive information;
    based on a determination that the multimedia file is not sensitive information, using a current operating system to process the multimedia file; and
    based on a determination that the multimedia file is sensitive information, using the designated operating system to process the multimedia file for the current operating system.

2. The method of claim 1, wherein selecting the designated operating system according to the attribute of the multimedia file comprises:
    determining, according to the attribute of the multimedia file, candidate operating systems from the multiple operating systems having permission to process the multimedia file; and
    selecting, from the candidate operating systems, an operating system with the highest security level as the designated operating system according to security levels of the candidate operating systems.

3. The method of claim 1, wherein using the designated operating system to process the multimedia file for the current operating system comprises at least one of:
    using the designated operating system to encode or decode the multimedia file for the current operating system;
    using the designated operating system to copy, move, or edit the multimedia file for the current operating system;
    using the designated operating system to delete the multimedia file for the current operating system; or
    configuring, in the designated operating system, processing permission on the multimedia file for each operating system of the multiple operating systems.

4. The method of claim 1, wherein the attribute of the multimedia file comprises at least one of a name of the multimedia file, a source of the multimedia file, or a security level of the multimedia file.

5. A computing system having multiple operating systems for multimedia file processing, comprising:
    at least one processor configured to execute instructions stored in memory that cause the processor to:
    select a designated operating system from the multiple operating systems;
    determine whether the multimedia file is sensitive information based on a security level of the multimedia file;
    based on a determination that the multimedia file is not sensitive information, use a current operating system to decode or encode the multimedia file; and
    based on a determination that the multimedia file is sensitive information, use the designated operating system to decode or encode the multimedia file for the current operating system.

6. The computing system of claim 5, wherein the at least one processor is further configured to execute instructions that cause the at least one processor to:
    select the designated operating system according to at least one of an attribute of the multimedia file or security levels of the multiple operating systems.

7. The computing system of claim 5, wherein the at least one processor is further configured to execute instructions that cause the at least one processor to:
    determine, according to an attribute of the multimedia file, candidate operating systems from the multiple operating systems having permission to process the multimedia file.

8. The computing system of claim 7, wherein the at least one processor is further configured to execute instructions that cause the at least one processor to:
    select, from the candidate operating systems, the designated operating system according to at least one of a selection command received or security levels of the candidate operating systems.

9. The computing system of claim 7, wherein the attribute of the multimedia file comprises at least one of a name of the multimedia file, a source of the multimedia file, or a security level of the multimedia file.

10. A non-transitory computer readable storage medium having stored thereon programs codes that, when executed by a computing system having multiple operating systems, cause the computing system to:
    select a designated operating system from the multiple operating systems according to at least one of an attribute of a multimedia file or security levels of the multiple operating systems;
    determine whether the multimedia file is sensitive information; and based on a determination that the multimedia file is sensitive information, use the designated operating system to encode or decode the multimedia file for a current operating system.

11. The non-transitory computer readable storage medium of claim 10, wherein the program codes to select the designated operating system from the multiple operating systems comprise program codes that cause the computing system to:
select the designated operating system from the multiple operating systems according to a selection command received.

12. The non-transitory computer readable storage medium of claim 10, wherein the attribute of the multimedia file comprises at least one of a name of the multimedia file, a source of the multimedia file, or a security level of the multimedia file.

13. The method of claim 1, wherein determining whether the multimedia file is the sensitive information is based on a sender of the multimedia file.

14. The method of claim 1, wherein determining whether the multimedia file is the sensitive information is based on an attribute of the multimedia file.

15. The method of claim 14, wherein the attribute of the multimedia file is at least one of a name of the multimedia file, a source of the multimedia file, or a security level of the multimedia file.

16. The method of claim 1, wherein the multimedia file is not secondarily encrypted in the current operating system.

17. The method of claim 2, wherein a number of the candidate operating systems is less than a number of the multiple operating systems.

* * * * *